US012321556B1

(12) United States Patent
Jain et al.

(10) Patent No.: US 12,321,556 B1
(45) Date of Patent: Jun. 3, 2025

(54) TOUCH SENSOR PANEL WITH REDUCED DIMENSIONS AND CROSS-COUPLING

(71) Applicant: Apple Inc., Cupertino, CA (US)

(72) Inventors: Karan S. Jain, San Jose, CA (US); Sung Yul Chu, San Jose, CA (US); Zhou Lu, Fremont, CA (US); Jeffrey M. Weisse, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/352,188

(22) Filed: Jul. 13, 2023

Related U.S. Application Data

(60) Provisional application No. 63/371,026, filed on Aug. 10, 2022.

(51) Int. Cl.
G06F 3/044 (2006.01)
G06F 3/041 (2006.01)

(52) U.S. Cl.
CPC ........ *G06F 3/0445* (2019.05); *G06F 3/04164* (2019.05); *G06F 2203/04102* (2013.01); *G06F 2203/04107* (2013.01); *G06F 2203/04111* (2013.01)

(58) Field of Classification Search
CPC ..................................................... G06F 3/0445
USPC ....................................................... 345/174
See application file for complete search history.

(56) References Cited

U.S. PATENT DOCUMENTS

| 8,633,916 | B2 | 1/2014 | Bernstein et al. |
| 9,122,901 | B2 | 9/2015 | Slgedal et al. |
| 9,870,033 | B1 | 1/2018 | Browning et al. |
| 10,095,339 | B1* | 10/2018 | Tsai ....................... G06F 3/0412 |
| 10,331,178 | B2 | 6/2019 | Shah et al. |
| 10,809,784 | B2 | 10/2020 | Yamazaki et al. |
| 10,901,543 | B1* | 1/2021 | Bayat ..................... G06F 3/0446 |
| 10,990,222 | B2 | 4/2021 | Wang et al. |
| 11,157,101 | B2 | 10/2021 | Wang |
| 11,209,864 | B2 | 12/2021 | Tan et al. |
| 11,574,971 | B2 | 2/2023 | Lee et al. |
| 2015/0009422 | A1* | 1/2015 | Tung ..................... G06F 3/0443 349/12 |

(Continued)

FOREIGN PATENT DOCUMENTS

| CN | 210639594 U | 5/2020 |
| CN | 112732116 A | 4/2021 |

(Continued)

*Primary Examiner* — Long D Pham
(74) *Attorney, Agent, or Firm* — Kubota & Basol LLP

(57) ABSTRACT

Disclosed herein is a touch sensor panel that includes a substrate that includes a bending portion, and a plurality of electrodes formed in a first layer on a first surface of the substrate, the plurality of electrodes forming first electrodes and second electrodes and the plurality of electrodes defining an active area for touch sensing. The touch sensor panel further includes a plurality of routing traces formed in the first layer on the first surface of the substrate in a border area outside the active area and formed from the first material (copper), a plurality of bridges formed in a second layer, the plurality of bridges connecting groups of the plurality of electrodes to form the first electrodes and formed from a second material (silver), and sensing circuitry connected to the substrate and to the plurality of routing traces at a location after the bending portion.

20 Claims, 11 Drawing Sheets

(56) References Cited

U.S. PATENT DOCUMENTS

| | | | |
|---|---|---|---|
| 2015/0193059 A1* | 7/2015 | Reynolds | G06F 3/0412 |
| | | | 345/174 |
| 2015/0201487 A1* | 7/2015 | Kee | G02F 1/133305 |
| | | | 361/749 |
| 2018/0315735 A1* | 11/2018 | Delacruz | H01L 25/16 |
| 2020/0133409 A1* | 4/2020 | Tanemura | G06F 3/0443 |
| 2020/0201482 A1* | 6/2020 | Weisse | G06F 3/0443 |
| 2021/0132724 A1* | 5/2021 | Kwon | G06F 3/041 |
| 2021/0141491 A1* | 5/2021 | Gogte | G06F 3/0446 |
| 2021/0326004 A1* | 10/2021 | Park | G06V 40/1306 |
| 2021/0408410 A1* | 12/2021 | Chen | G02F 1/133305 |
| 2022/0050554 A1* | 2/2022 | Feng | G06F 3/04164 |
| 2022/0083162 A1* | 3/2022 | Xu | G06F 3/0446 |
| 2022/0100315 A1* | 3/2022 | Yu | G06F 3/0446 |
| 2022/0129093 A1* | 4/2022 | Lin | G02F 1/1677 |
| 2022/0132659 A1 | 4/2022 | Seo | |
| 2022/0342498 A1 | 10/2022 | Wang et al. | |
| 2023/0108868 A1 | 4/2023 | Go et al. | |

FOREIGN PATENT DOCUMENTS

| | | |
|---|---|---|
| CN | 111930274 B | 5/2022 |
| CN | 218547962 U | 2/2023 |
| WO | 2023/071639 A1 | 5/2023 |

* cited by examiner

TOUCH SENSOR PANEL WITH REDUCED DIMENSIONS AND CROSS-COUPLING

CROSS-REFERENCE TO RELATED APPLICATIONS

This application claims the benefit of U.S. Provisional Application No. 63/371,026, filed Aug. 10, 2022, the content of which is incorporated herein by reference in its entirety for all purposes.

FIELD OF THE DISCLOSURE

This relates generally to touch sensor panels, and more particularly, to touch sensor panels with ultra-thin stack-ups, reduced border dimensions, and reduced cross-coupling.

BACKGROUND OF THE DISCLOSURE

Many types of input devices are presently available for performing operations in a computing system, such as buttons or keys, mice, trackballs, joysticks, touch sensor panels, touch screens and the like. Touch sensor panels and touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates generally to touch sensor panels, and more particularly, to touch sensor panels with ultra-thin stack-ups, reduced border dimensions, and reduced cross-coupling. In some examples, a touch sensor panel includes a substrate formed from a flexible material. The substrate can include a bending portion that enables routing of the touch electrodes to sensing circuitry without the use of a flexible circuit or other routing means that may add to the stack-up height. In some examples, the touch sensor panel includes a plurality of electrodes formed in a first layer on a first surface of the substrate from a first material, the plurality of electrodes forming first electrodes and second electrodes and the plurality of electrodes defining an active area for touch sensing. In some examples, the plurality of routing traces is formed in the first layer on the first surface of the substrate in a border area outside the active area, the plurality of routing traces formed from the first material (e.g., including copper). In some examples, a plurality of bridges is formed in a second layer, that is different from the first layer, where the plurality of bridges connects groups of the plurality of electrodes to form the first electrodes, and the plurality of bridges formed from a second material that is different from the first material (e.g., including silver). In some examples, a shield is included around the perimeter of the touch sensor panel or a portion thereof to reduce parasitic cross-coupling.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to touch sensor panels, and more particularly, to touch sensor panels with ultra-thin stack-ups, reduced border dimensions, and reduced cross-coupling. In some examples, a touch sensor panel includes a substrate formed from a flexible material. The substrate can include a bending portion that enables routing of the touch electrodes to sensing circuitry without the use of a flexible circuit or other routing means that may add to the stack-up height. In some examples, the touch sensor panel includes a plurality of electrodes formed in a first layer on a first surface of the substrate from a first material, the plurality of electrodes forming first electrodes and second electrodes and the plurality of electrodes defining an active area for touch sensing. In some examples, the plurality of routing traces is formed in the first layer on the first surface of the substrate in a border area outside the active area, the plurality of routing traces formed from the first material (e.g., including copper). In some examples, a plurality of bridges is formed in a second layer, that is different from the first layer, where the plurality of bridges connects groups of the plurality of electrodes to form the first electrodes, and the plurality of bridges formed from a second material that is different from the first material (e.g., including silver). In some examples, a shield is included around the perimeter of the touch sensor panel to reduce parasitic cross-coupling.

Figure 1:
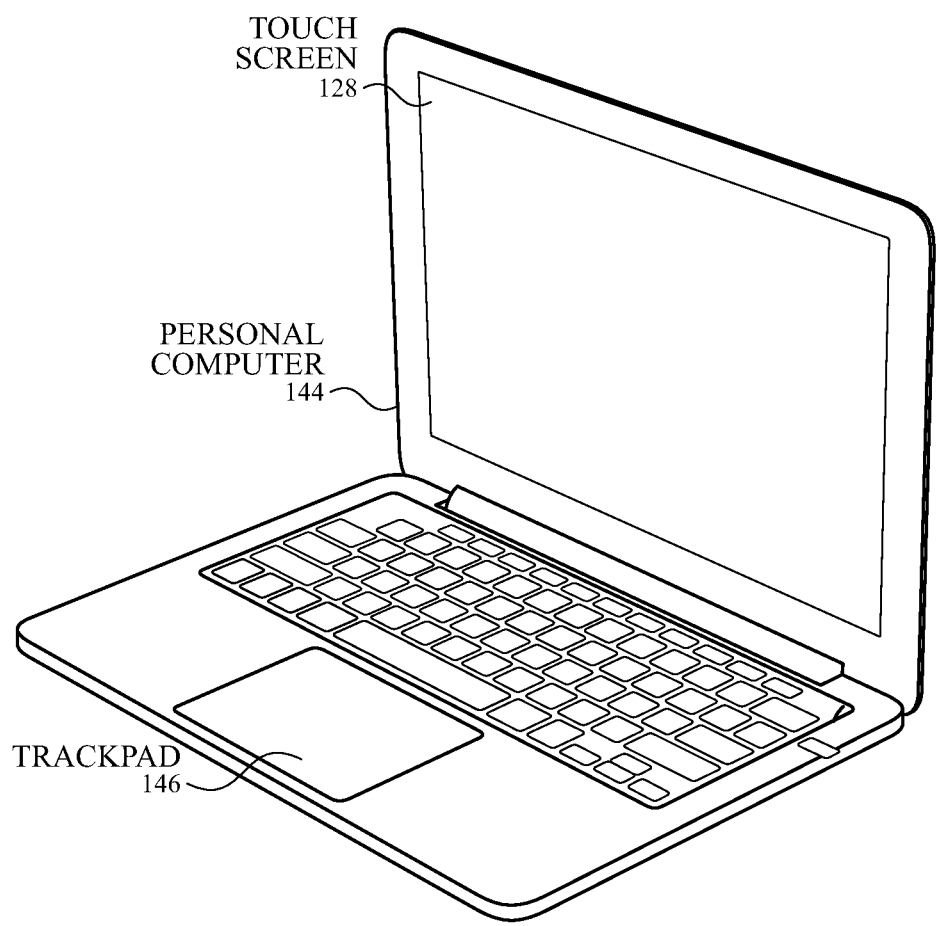
FIG. 1 illustrates an example system that can include touch screens with ultra-thin stack-ups according to examples of the disclosure.

FIG. 1 illustrates an example system that can include one or more touch sensor panels according to examples of the disclosure. FIG. 1 illustrates an example personal computer 144 that includes a touch screen 128 and a trackpad 146 that can be implemented with ultra-thin touch sensor panel stack-ups according to examples of the disclosure. It is understood that a touch sensor panel as described herein can be implemented in other devices such as a smart phone, wearable device, media player, tablet computer, desktop computer, laptop computer, data server, cloud storage service, or any other portable or non-portable electronic computing device. In some examples, the touch sensor panel can be implemented in a keyboard or trackpad device in communication with another computing system.

In some examples, touch sensor panels such as the touch sensor panels implemented in touch screen 128 or trackpad 146 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch sensor panel can include a plurality of individual touch electrodes, each touch electrode identifying or representing a unique location (e.g., a touch node) on the touch sensor panel at which touch or proximity is to be sensed, and each touch node electrode being electrically isolated from the other touch node electrodes in the touch sensor panel. Such a touch sensor panel can be referred to as a pixelated self-capacitance touch sensor panel, though it is understood that in some examples, the touch node electrodes on the touch sensor panel can be used to perform scans other than self-capacitance scans on the touch sensor panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch sensor panel. In some examples, the touch node electrodes of a self-capacitance based touch system can be formed from rows and columns of conductive material, and changes in the self-capacitance to ground of the rows and columns can be detected, similar to above. In some examples, a touch sensor panel can be multi-touch, single touch, projection scan, full-imaging multi-touch, capacitive touch, etc.

In some examples, touch sensor panels such as the touch sensor panels implemented in touch screen 128 or trackpad 146 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., increase). This change in the mutual capacitance of the touch node can be detected and measured by the touch sensing system to determine the positions of multiple objects when they touch, or come in proximity to, the touch sensor panel. As described herein, in some examples, a mutual capacitance based touch system can form touch nodes from a matrix of small, individual plates of conductive material.

In some examples, touch sensor panels such as the touch sensor panels implemented in touch screen 128 or trackpad 146 can be based on mutual capacitance and/or self-capacitance. The electrodes can be arranged as a matrix of small, individual plates of conductive material (e.g., as in touch node electrodes 408 in touch sensor panel 402 in FIG. 4B) or as drive lines and sense lines (e.g., as in row touch electrodes 404 and column touch electrodes 406 in touch sensor panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
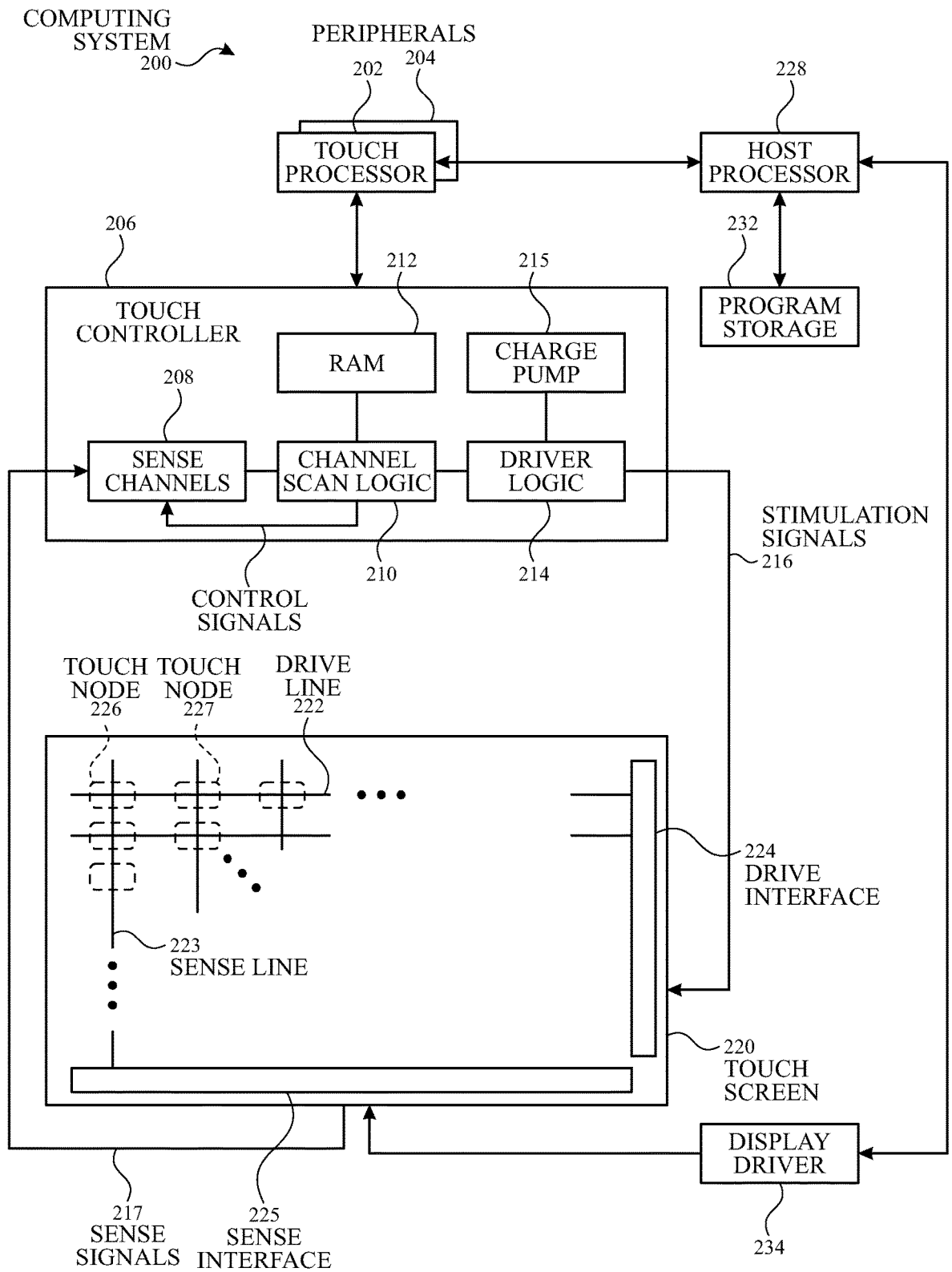
FIG. 2 illustrates an example computing system including a touch screen according to examples of the disclosure.

FIG. 2 illustrates an example computing system including a touch sensor panel according to examples of the disclosure. Computing system 200 can be included in, for example, a mobile phone, tablet, touchpad, portable or desktop computer, portable media player, wearable device or any mobile or non-mobile computing device that includes a touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch sensor panel 220, as described in more detail below. In some examples, touch controller 206, touch processor 202 and peripherals 204 can be integrated into a single application specific integrated circuit (ASIC), and in some examples can be integrated with touch sensor panel 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver or more generally, display driver 234. It is understood that although some examples of the disclosure are described with reference to LCD displays, the scope of the disclosure is not so limited and can extend to other types of displays, such as Light-Emitting Diode (LED) displays, including Organic LED (OLED), Active-Matrix Organic LED (AMO-LED) and Passive-Matrix Organic LED (PMOLED) displays. The display driver 234 can provide voltages on select (e.g., gate) lines to each pixel transistor and can provide data signals along data lines to these same transistors to control the pixel display image.

Host processor 228 can use display driver 234 to generate a display image on a display or touch screen (e.g., a display integrated with touch sensor panel 220), such as a display image of a user interface (UI), and can use touch processor 202 and touch controller 206 to detect a touch on or near touch sensor panel 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch sensor panel 220 (e.g., integrated into a touch screen or trackpad) can be used to derive touch information at multiple discrete locations of the touch sensor panel, referred to herein as touch nodes. Touch sensor panel 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch sensor panel 220 is viewed as capturing an "image" of touch ("touch image"). In other words, after touch controller 206 has determined whether a touch has been detected at each touch nodes in the touch sensor panel, the pattern of touch nodes in the touch sensor panel at which a touch occurred can be thought of as an "image" of touch (e.g., a pattern of fingers touching the touch sensor panel). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
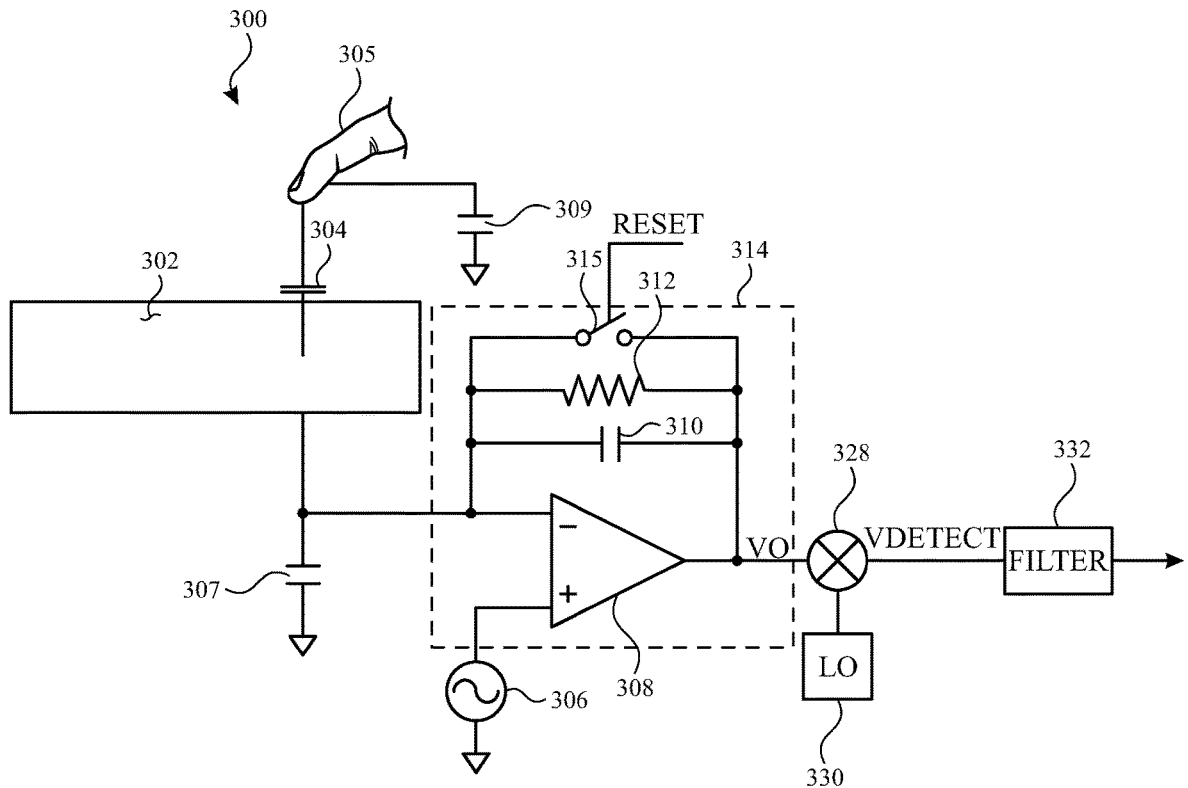
FIG. 3A illustrates an example touch sensor circuit corresponding to a self-capacitance measurement of a touch node electrode and sensing circuit according to examples of the disclosure.

FIG. 3A illustrates an example touch sensor circuit 300 corresponding to a self-capacitance measurement of a touch node electrode 302 and sensing circuit 314 according to examples of the disclosure. Touch node electrode 302 can correspond to a touch electrode 404 or 406 of touch sensor panel 400 or a touch node electrode 408 of touch sensor panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
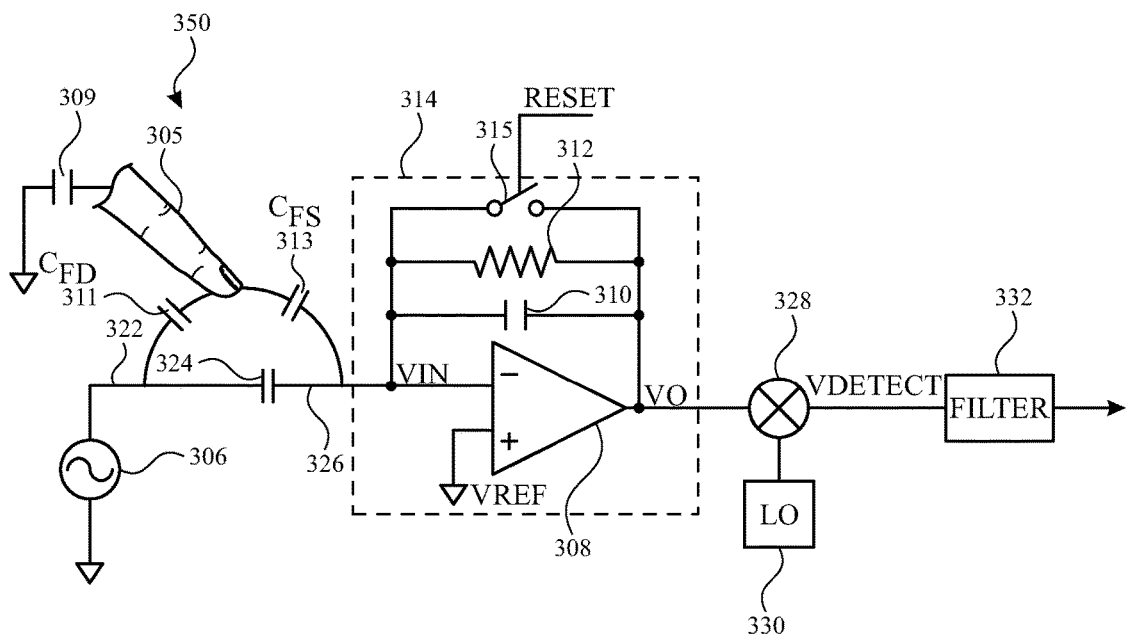
FIG. 3B illustrates an example touch sensor circuit corresponding to a mutual-capacitance drive line and sense line and sensing circuit according to examples of the disclosure.

FIG. 3B illustrates an example touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized.

The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch sensor panel 220 can be implemented as part of an integrated touch screen in which touch sensing circuit elements of the touch sensing system can be integrated into the display pixel stack-ups of a display. The circuit elements in an integrated touch screen can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
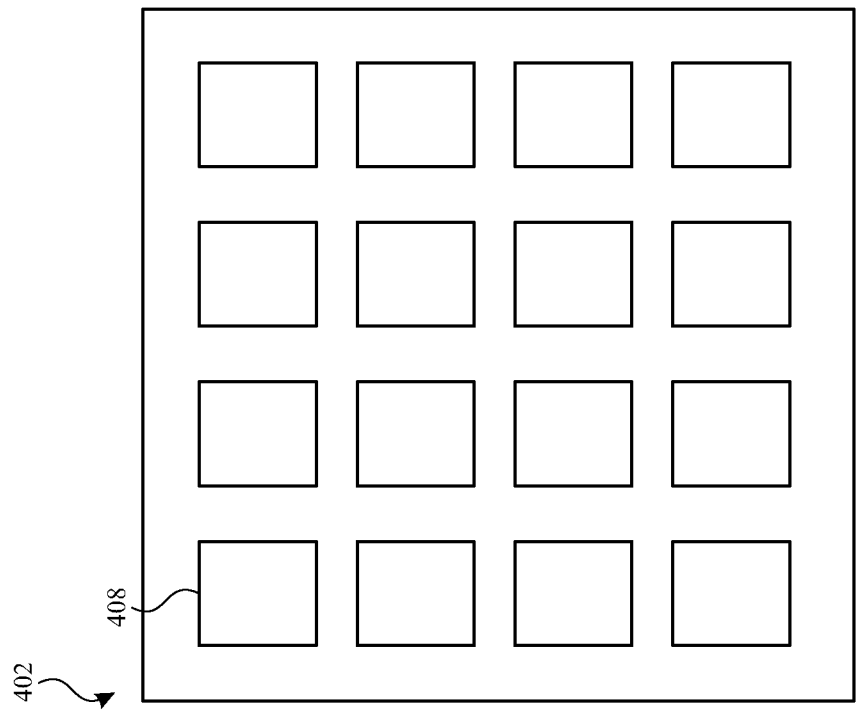
FIG. 4B illustrates touch screen with touch node electrodes arranged in a pixelated touch node electrode configuration according to examples of the disclosure.
Figure 4A:
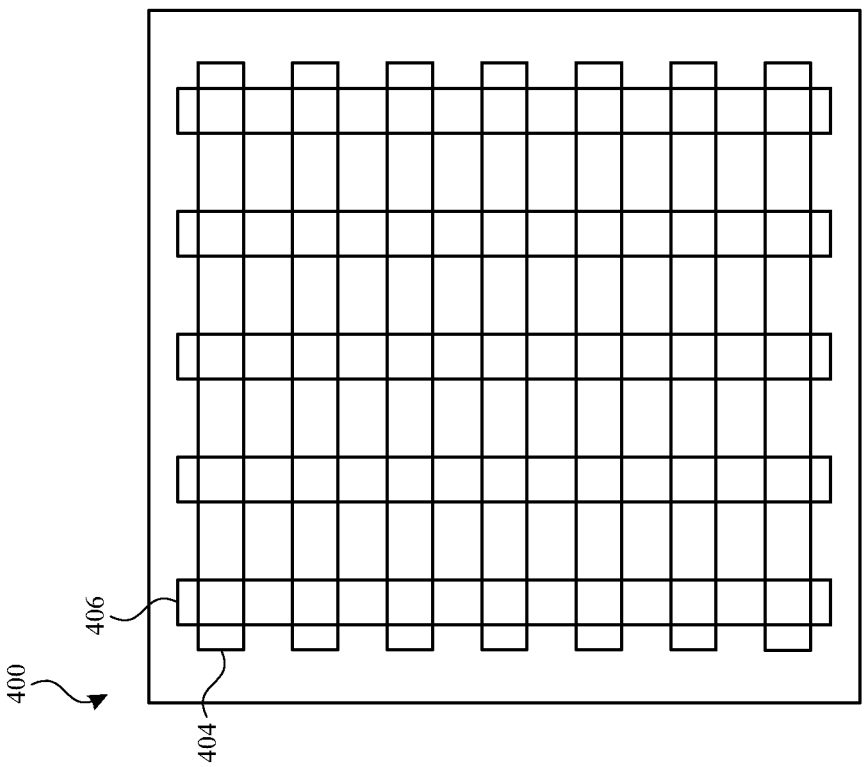
FIG. 4A illustrates touch screen with touch electrodes arranged in rows and columns according to examples of the disclosure.

FIG. 4A illustrates touch sensor panel 400 with touch electrodes 404 and 406 arranged in rows and columns according to examples of the disclosure. Specifically, touch sensor panel 400 can include a plurality of touch electrodes 404 disposed as rows, and a plurality of touch electrodes 406 disposed as columns. Touch electrodes 404 and touch electrodes 406 can be on the same or different material layers on touch sensor panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. In some examples, the conductive plates can be formed from other materials including conductive polymers, metal mesh, graphene, nanowires (e.g., silver nanowires) or nanotubes (e.g., carbon nanotubes). Electrodes displayed on layers on different sides of the substrate can be referred to herein as a double-sided sensor. In some examples, touch sensor panel 400 can sense the self-capacitance of touch electrodes 404 and 406 to detect touch and/or proximity activity on touch sensor panel 400, and in some examples, touch sensor panel 400 can sense the mutual capacitance between touch electrodes 404 and 406 to detect touch and/or proximity activity on touch sensor panel 400.

FIG. 4B illustrates touch sensor panel 402 with touch node electrodes 408 arranged in a pixelated touch node electrode configuration according to examples of the disclosure. Specifically, touch sensor panel 402 can include a plurality of individual touch node electrodes 408, each touch node electrode identifying or representing a unique location on the touch sensor panel at which touch or proximity (i.e., a touch or proximity event) is to be sensed, and each touch node electrode being electrically isolated from the other touch node electrodes in the touch sensor panel, as previously described. Touch node electrodes 408 can be on the same or different material layers on touch sensor panel 400. In some examples, touch sensor panel 400 can sense the self-capacitance of touch node electrodes 408 to detect touch and/or proximity activity on touch sensor panel 400, and in some examples, touch sensor panel 400 can sense the mutual capacitance between touch node electrodes 408 to detect touch and/or proximity activity on touch sensor panel 400.

As described herein, in some examples, reducing the form factor of the touch sensor panel is desirable. In some examples, a single-sided touch sensor panel can be used to reduce the thickness of the stack-up compared with a double-sided touch sensor panel design. In some examples, the border region can be reduced by using a copper etching process. In some examples, a shield can be included around the perimeter of the touch sensor panel to reduce parasitic cross-coupling.

Figure 5:
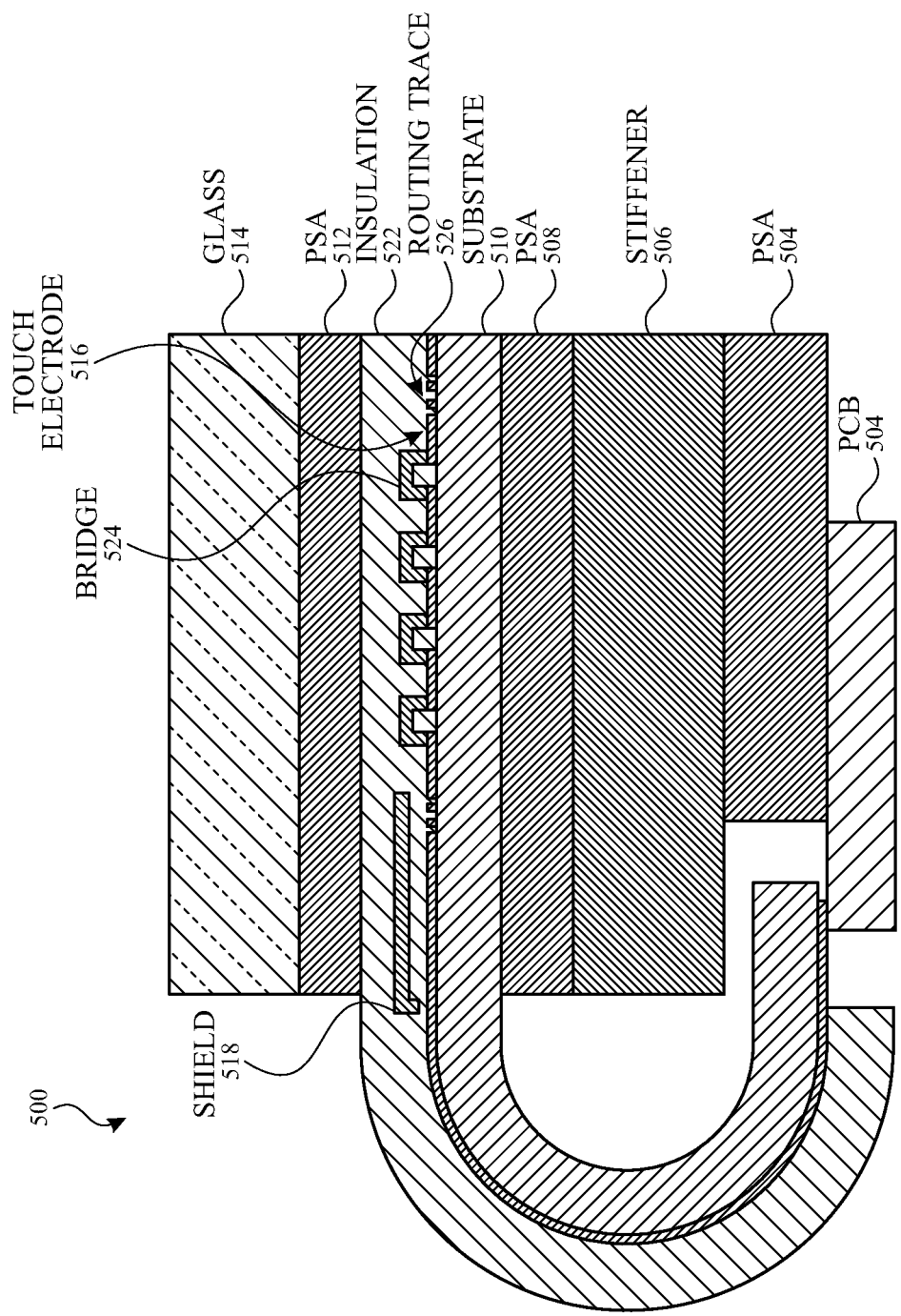
FIG. 5 illustrates an example touch sensor panel stack-up according to examples of the disclosure.
Figure 6:
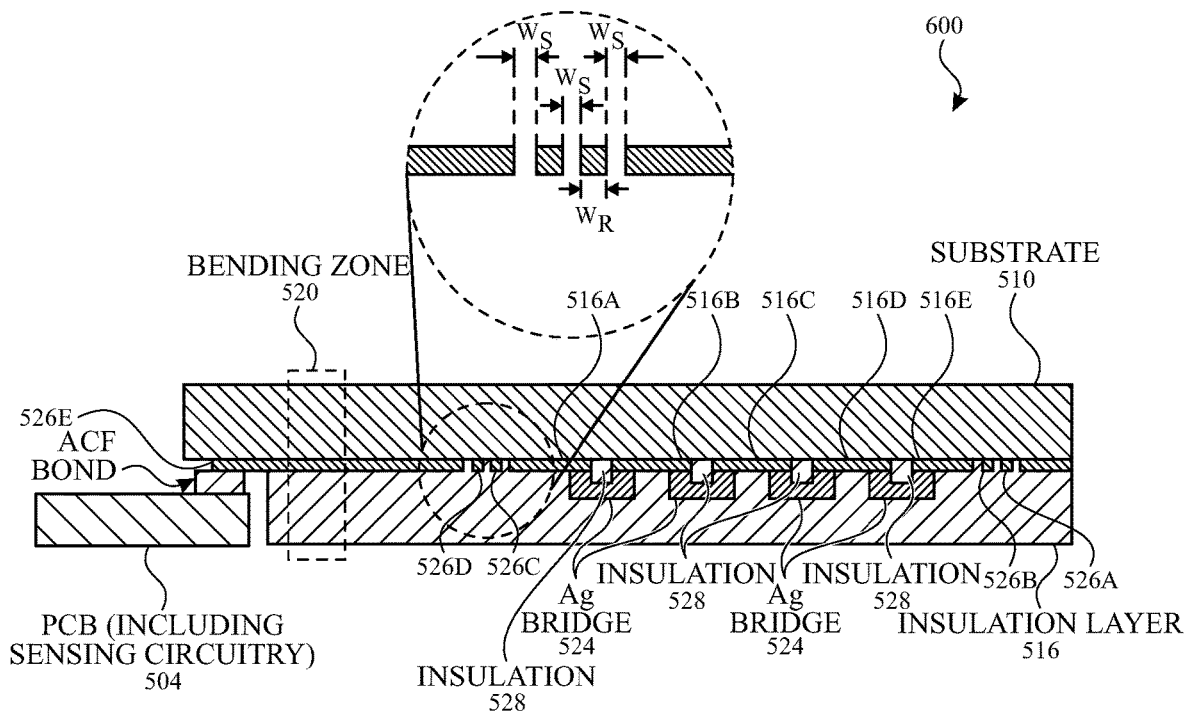
FIG. 6 illustrates an enlarged view showing additional detail regarding the touch electrodes and routing electrodes for a modified touch sensor panel stack-up according to examples of the disclosure.

FIG. 5 illustrates an example touch sensor panel stack-up according to examples of the disclosure. FIG. 6 illustrates an enlarged view showing additional detail regarding the touch electrodes and routing electrodes for a modified touch sensor panel stack-up 600 (similar to touch sensor panel stack-up 500) according to examples of the disclosure. The touch sensor panel stack-up 600 in FIG. 6 is shown prior to bending, without a ground shield, and upside down compared with implementation in touch sensor panel stack-up 500. Touch sensor panel stack-up 500 can include a printed circuit board (PCB) 502 on which the sensing circuitry for the touch sensor panel can be implemented, a pressure sensitive adhesive (PSA) 504, a stiffener 506, a PSA 508, a substrate 510 on which the touch sensor panel electrodes can be implemented, a PSA 512, and a glass 514 (also referred to as a front crystal). Although PSAs are described, it is understood that other adhesives may be used in the touch sensor panel stack-up. Additionally, although referred to as a glass or front crystal, it is understood that the glass 514 can represent an outer surface formed of other materials than glass or crystal (e.g., plastic). Substrate 510 can be a flexible plastic substrate such as a polyethylene terephthalate (PET) substrate, though other substrates can be used. The touch electrodes can be formed on substrate 510 using a single-sided row-column sensor process with copper touch electrodes 516. It should be noted that the single-sided sensor process is thinner than a double side sensor process, thus reducing the stack-up height of touch sensor panel stack-up 500. A single bond site can be used for connection between the touch sensor electrodes/routing on the substrate 510 and the PCB 502 using and anisotropic conductive film (ACF) bond (e.g., for simpler manufacturing/integration). The stiffener can be a material (e.g., such as a metal or alloy) to provide structural strength and stability to the touch sensor panel stack-up.

Figure 7:
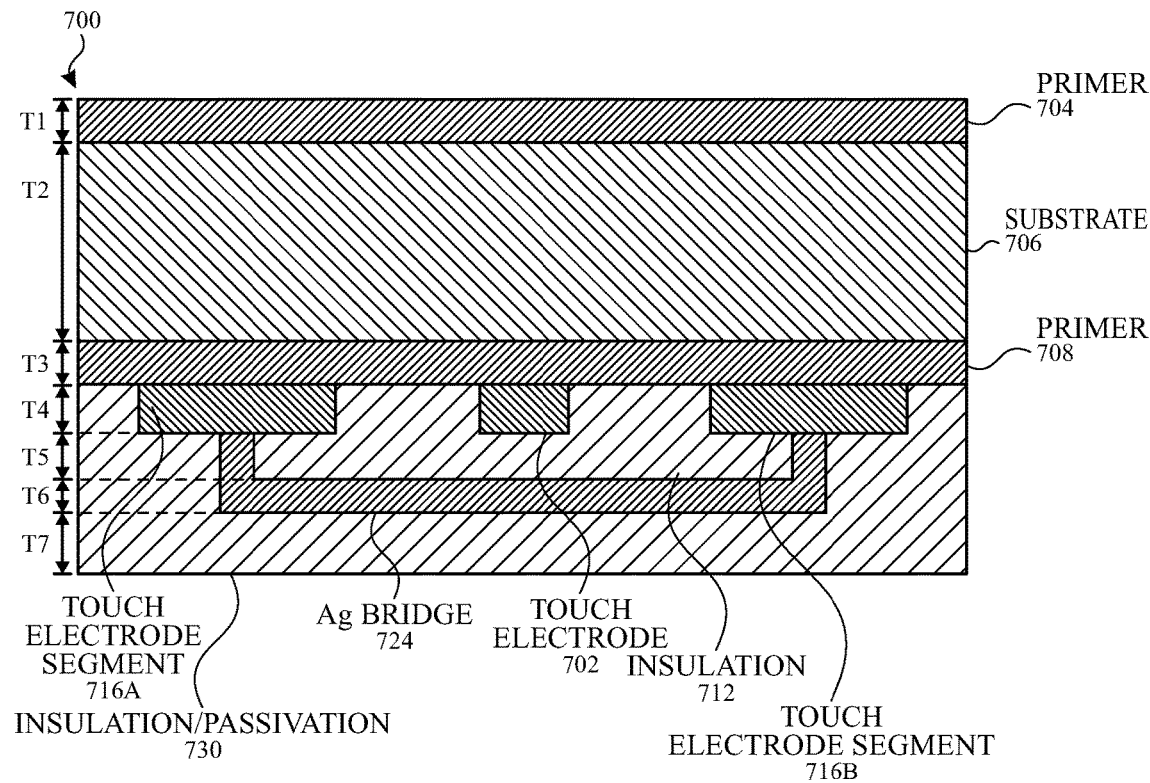
FIG. 7 illustrates an enlarged view showing additional detail regarding the touch electrodes of an example sensor stack-up according to examples of the disclosure.

In some examples, copper touch electrodes 516 and copper routing traces 526 are formed by a copper etching process that enables thinner copper routing traces for a thinner border. For example, the illustrations of FIGS. 5-6 shows copper touch electrode segments 516A-516E for one touch electrode for one axis of a two-axis touch sensor panel (e.g., a row touch electrode). FIGS. 5-6 also illustrate routing traces 526A-526D in the border region and routing trace 526E from the active area of the touch sensor panel to the sensing circuitry. It is understood that the touch sensor panel can include additional touch electrodes and routing traces that are not shown in FIGS. 5-6 for simplicity of illustration. For example, the touch sensor panel stack-up can include additional routing traces (e.g., like routing traces 526A-526D) and each of the routing traces can be routed to the sensing circuitry using routing in the bending zone/portion (e.g., like routing trace 526E). Additionally, the touch sensor panel stack-up can include additional touch electrodes along the first axis (e.g., additional row touch electrodes), as well as touch electrodes for the second axis (e.g., column touch electrodes) implemented in the same layer as the touch electrodes along the first axis, but projecting from the plane of the sheet of drawings and running beneath silver bridges 524 (e.g., as shown in FIG. 7). The touch electrodes can be insulated from one another using insulation 528.

In some examples, the copper etching process enables a particular width ($W_R$) of the routing traces with a particular spacing ($W_S$) between the routing traces (and/or between routing traces and touch electrodes). In some examples the width and spacing are within a range of 10-40 μm. In some examples, the width and spacing are within a range of 15-30 μm. In some examples, the width and spacing are both 20 μm (e.g., within a threshold tolerance). In some examples, the width and spacing are less than 25 μm. As such, this thin border further reduces the size relative to designs using other processes with coarser resolution. In some examples, the routing width and spacing ranges mentioned above can refer to the minimum line/space resolution for the copper etching process.

Shown and described in greater detail hereinafter, the touch sensor panel stack-up 500 further includes silver bridges 524 connecting segments of copper touch electrodes 516 to form some of the touch electrodes located in the active area of touch sensor panel. For example, FIGS. 5-6 illustrate copper touch electrode segments 516A-516E for one touch electrode connected by silver bridges 524. In some examples, the touch sensor panel stack-up 500 also includes a silver grounding shield 518 (not shown in FIG. 6) over the copper routing traces at the border. Although not shown in FIG. 5, the grounding shield 518 can be coupled by a via to a copper ground electrode (e.g., routing trace) in the copper layer. It is understood that although the silver grounding shield 518 is described as being silver that other conductive materials can be used for shielding instead of or in addition to silver. The silver grounding shield 518 can be isolated from the routing traces by the insulation layer 522. The silver grounding shield 518 can effectively shield the routing traces from a user's fingers touching or in proximity to in the border region to reduce cross-coupling. The reduction in cross-coupling can improve touch sensing performance and thereby improve user experience. Although the shield is shown over the routing traces along one edge of the border, it is understood that the shield can extend over various locations of the touch sensor panel. For example, the shield can extend over partial sides of the border region of the touch sensor panel, a subset of sides of the border region of the touch sensor panel, and/or all four sides of the border of the touch sensor panel.

In some examples, and as shown in FIG. 5, substrate 510 is between 20-40 μm thick. This thin substrate can include a flexible material (e.g., PET) to enable flexing the substrate. The flexible substrate can enable "tail bending" in which touch electrodes on a first side of the substrate can be routed to the sensing circuitry on a second side of the substrate using routing traces on the substrate (e.g., instead of using a flexible printed circuit bonded to the first side of the substrate, which adds to the stack-up overall thickness). For example, bending a portion (tail portion) of the substrate enables the routing traces to wrap around from the first side of the substrate to the sensing circuitry on the opposite side opposite side of the stiffener 506. For example, the edge of substrate 510 bends 180-degrees, as shown in FIG. 5 (e.g., bending zone 520).

FIG. 7 illustrates an enlarged view showing additional detail regarding the touch electrodes of an example sensor stack-up according to examples of the disclosure. Touch sensor panel substrate 710 (e.g., corresponding to substrate 510), which optionally includes a first primer layer 704 on a first surface of the substrate and a second primer layer on a second surface of the substrate opposite the first surface. The primer layer(s) can a hard coating or protective layer for the substrate to provide mechanical stability and/or protection. The primer layer(s) can also be useful to prepare the substrate electrochemically for formation touch electrodes and routing electrodes using the copper etching process. Touch sensor panel stack-up 700 includes touch electrodes formed from copper. As illustrated, the touch electrodes can include a first electrode including touch electrode segments 716A-716B (e.g., corresponding to touch electrode segments 516A-516B) connected by silver bridge 724 (e.g., corresponding to silver bridge 524) and a second touch electrode 702 (e.g., perpendicular to the first touch electrode). The first touch electrode segments and the touch electrode can be isolated in the copper layer by insulation 712. The silver bridge 724 connecting the touch electrode segments can be a silver ink printed over the insulation 712. Further insulation and/or passivation 730 can be disposed over the bridge, other insulation material or over exposed electrodes.

As described herein, in some examples, the touch sensor stack-up of FIG. 7 can be implemented such that the total thickness (height) of the stack-up is less than 50 µm. In some examples, the total thickness of the stack-up is between 20-50 µm. In some examples, the total thickness is between 30-45 µm. In some examples, the total thickness is 40 µm±1 µm. FIG. 7 illustrates thickness T1-T7 for the stack-up with the sum of T1-T7 representing the total thickness. In some examples, T1 and T3 can each be approximately 100 nm±50 nm. In some examples, T2 can be between 20-30 µm. In some examples T2 can be less than 25 µm. In some examples, T4 can be approximately 200 nm±50 nm. In some examples, T5 can be approximately 1000 nm±100 nm. In some examples, T6 can be approximately 5 µm±1 µm. In some examples, T7 can be approximately 10 µm±2 µm.

Figure 8:
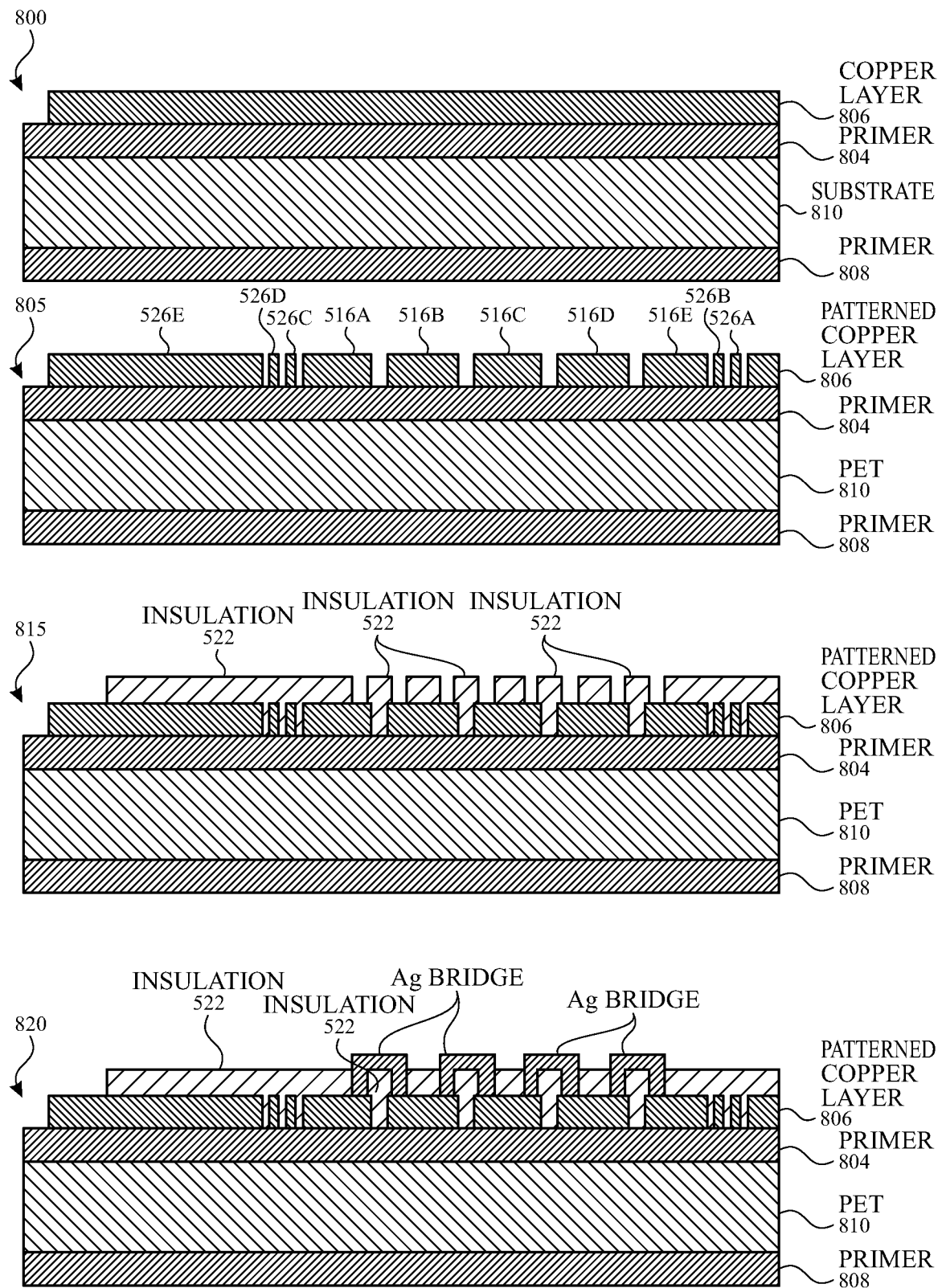
FIG. 8 illustrates the described single-sided touch sensor panel stack-up during a manufacturing process according to examples of the disclosure.
Figure 8:
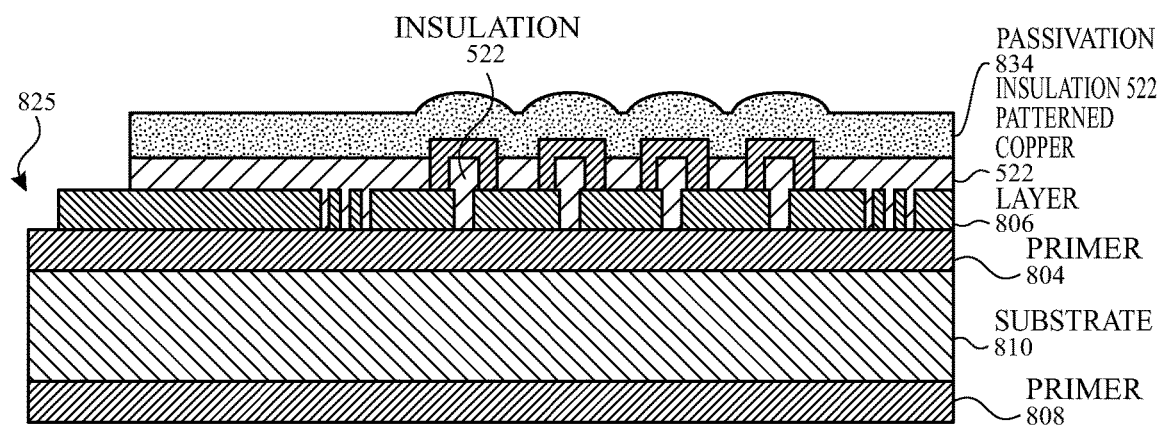
Figure 8:
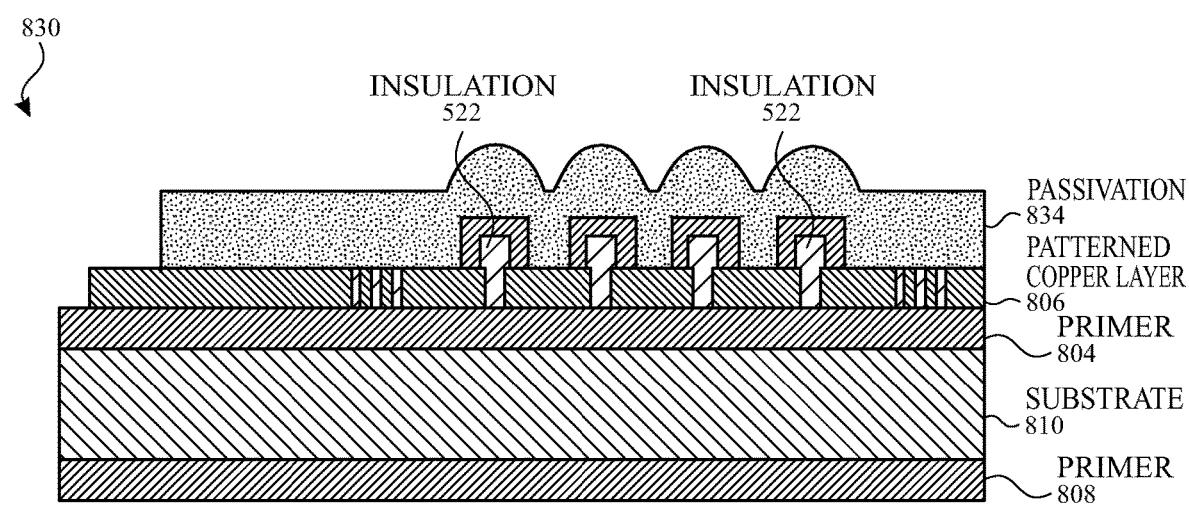

FIG. 8 illustrates the described single-sided touch sensor panel stack-up during a manufacturing process, including process stage 800, process stage 805, process stage 815, process stage 820, and process stage 825, according to examples of the disclosure. Process stage 830 illustrates a variation on the manufacturing process. As described herein, a single-sided copper electrode implementation using a flexible PET substrate enables a thin stack-up and reduced border region touch sensor panel stack-up including single-side interconnect solution with neutral plane engineering and tail bending. Although single-sided processing is shown for the single-sided touch sensor panel stack-up described herein, it is understood that in some examples, the processing can be implemented on both sides of a stack-up for a double-sided touch sensor panel stack-up.

Process stage 800 begins with deposition of copper on the substrate. Process stage 800 illustrates a substrate 810 of a single-sided stack-up including a first primer layer 804 and a second primer layer 808. A copper layer 806 can be deposited on first primer layer 804 (e.g., using a copper sputtering technique or other suitable deposition technique). Process stage 805 illustrates patterning of the copper layer 806 including touch electrodes and routing traces (e.g., using copper etching process with dry film resist or other suitable patterning techniques). As shown, the copper patterning can include the formation of copper touch electrodes 516A-516E and routing traces 526A-526E corresponding to FIGS. 5-6.

Process stage 815 continues with the deposition of the insulation material. In some examples, an insulation layer 522 is printed on top of the patterned copper layer 806. As shown, the insulation material can fill the gaps between the touch electrodes and/or routing traces in the patterned copper layer and thereby provide isolation. In some examples, after depositing the insulation material, through holes can be made to provide for bridging between touch electrode segments. Alternatively, the deposition of the insulation material can include via trenches. Process stage 820 continues with depositing silver to connect touch electrode segments (and to provide shielding for routing traces). For example, the deposition of silver can include screen printing silver ink on top of the insulation layer 522 and in the through holes. In some examples, the silver ink bridges are screen printed in a pattern for particular areas, such as shown by silver bridge 724 in FIG. 7.

Process stage 825 continues with deposition of a passivation layer 834 over the silver bridges (and optionally the silver shield, not shown). The passivation layer can prevent corrosion of the silver bridges (and optionally the silver shield). In some examples, additional insulation can be provided between the silver layer and the passivation layer. In some examples, the passivation layer can provide insulation.

As described above, the silver bridges through the insulation layer can be achieved by deposition of the insulation layer and forming through holes through the insulation layer through which the silver-to-copper connections can be made. Process stage 830 shows an alternative. Rather than a blanket deposition of insulation material (optionally with via trenches), insulation can be patterned. For example, the pattern of insulation can primarily fill the gaps etched in the copper layer for isolation. The silver bridges can be formed to connect the touch electrode segments. Subsequently, the passivation can be deposited over the silver bridges as described with respect to process stage 825 The stack-up resulting from insulation deposition according to process stage 830 can be thinner than from insulation deposition according to process stage 815, but may result in larger peaks in the passivation layer over the silver bridges.

Figure 9:
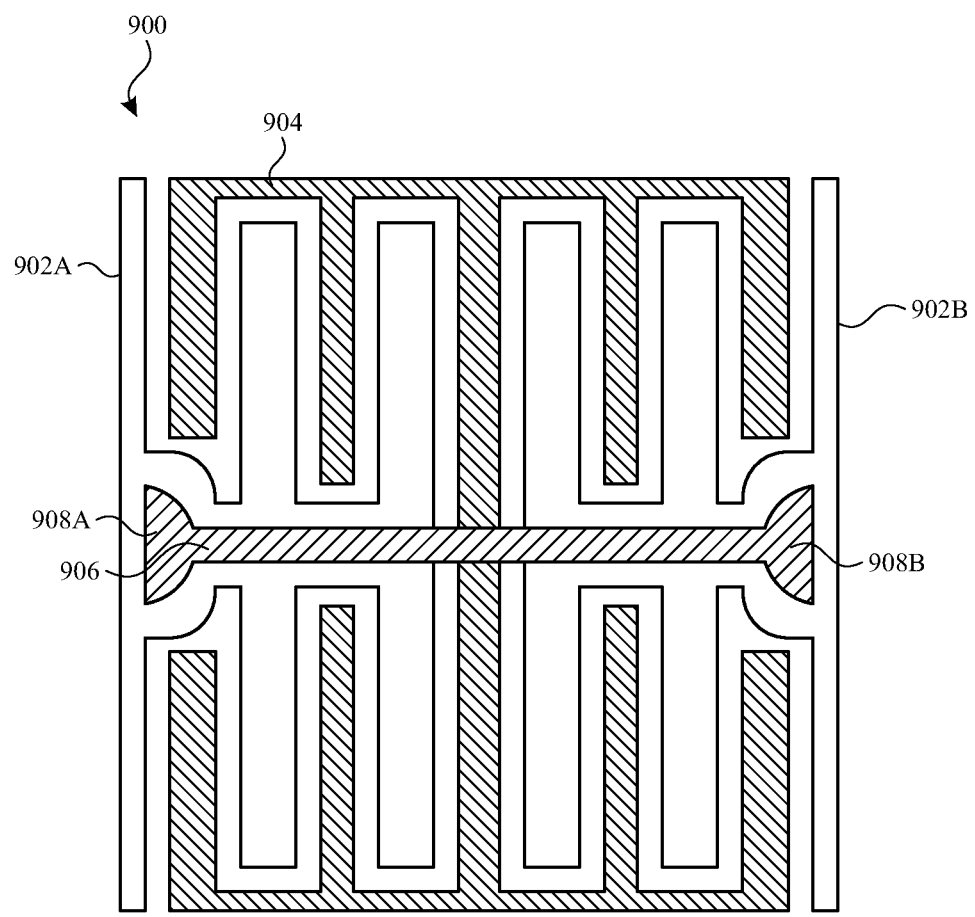
FIG. 9 illustrates an example touch node of the touch sensor panel corresponding to a first touch electrode and a second touch electrode according to examples of the disclosure.

FIG. 9 illustrates a touch node 900 of the touch sensor panel corresponding to a first touch electrode and a second touch electrode 904 according to examples of the disclosure. The first touch electrode can include multiple touch electrode segments 902A-902B (e.g., corresponding to touch electrode segments 716A-715B) connected by a silver bridge 906 (e.g., corresponding to silver bridge 724) at connection points 908A-908B. The touch electrode segments 902A-902B and the second touch electrode 904 (e.g., corresponding to second touch electrode 702) can be implemented in the copper layer (e.g., patterned copper layer 806). The silver bridge 906 can be implemented in a silver layer. In some examples, touch node 900 can represent a unit cell that be repeated across the touch sensor panel.

As illustrated in FIG. 9, the first and second touch electrodes can have a comb structures. For example, the touch electrode segments 902A-902B can include a first comb structure and the second touch electrode 904 can have a second comb structure. The comb structures of the first and second touch electrodes can be complementary such that the prongs of the first comb structure interlock with progs of the second comb structure. To enable the bridge connection between touch electrode segments 902A-902B by silver bridge 906 (e.g., in the silver layer), connections can be made to a portion of touch electrode segments 902A-902B. For example, vias 908A-908 can be used. As shown, the comb structure can be primarily rectangular, but the connection points for the bridges can cause a deviation in the comb structure for the first touch electrode segments 902A-902B. For example, the semicircle vias 908A-908B in the repeating pattern can represent circular vias and the area of the touch electrode segments 902A-902B at which the connection is made can also have a circular shape (e.g., a departure from the otherwise rectangular comb structure). It is understood that the touch electrodes shown in FIG. 9 are representative, and other shapes or patterns can be used. As shown in FIG. 9, the silver bridges can connect the touch electrode segments 902A-902B from left edge of the unit cell to the right edge of the unit cell (e.g., the connection is not made simply over the vertical portion of the second touch electrode separating touch electrode segments 902A-902B, but is also over the backbone portions of the touch electrode segments 902A-902B). It is understood that in the repeating pattern that the connections are thereby from the center of touch electrode segments 902A (when considering its mirrored half) to the center of touch electrode segments 902B (when considering its mirrored half). Thus, the silver bridge can be within a threshold (e.g., 5%, 10%, etc.) of the pitch distance of the unit cell.

Figure 10:
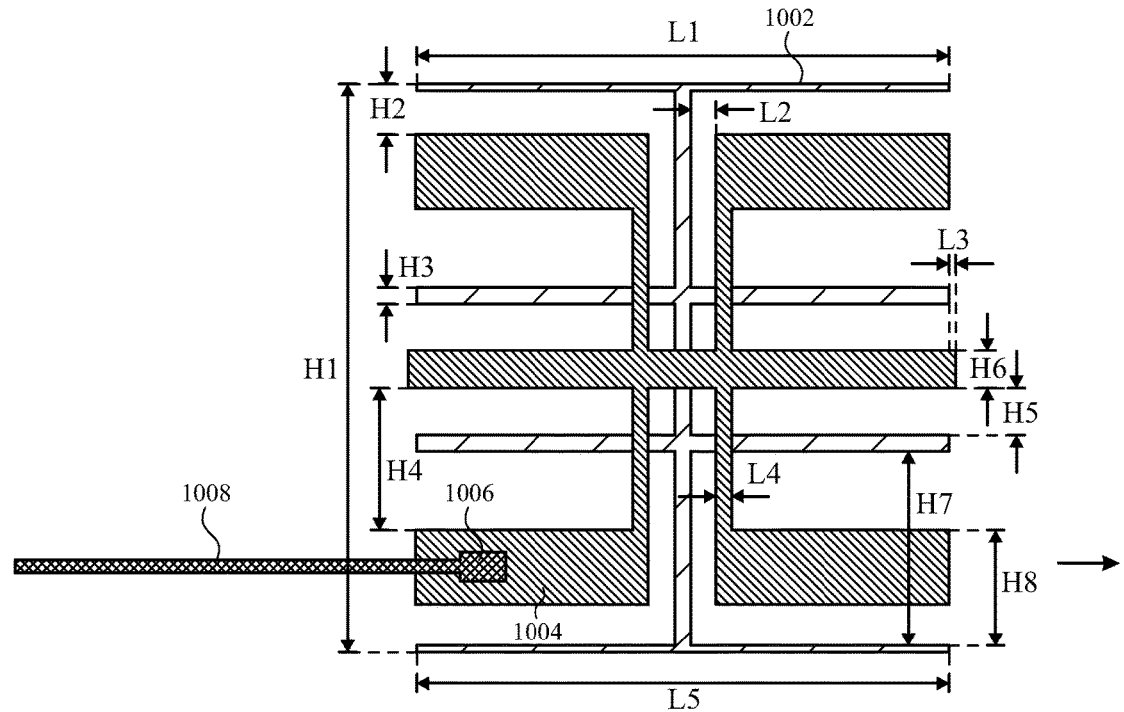
FIG. 10 illustrates an example touch node of the touch sensor panel corresponding to a first touch electrode and a second touch electrode according to examples of the disclosure.

Although primarily described herein as touch electrodes formed in a copper layer with silver bridges connecting segments, in some examples, the touch electrodes can be formed in different layers. For example, the first electrodes can be formed in a copper layer and the second electrodes can be formed in a silver layer. FIG. 10 illustrates an example touch node of the touch sensor panel corresponding to a first touch electrode 1002 and a second touch electrode 1004 according to examples of the disclosure. The first touch electrode 1002 can be implemented in the copper layer and the second touch electrode 1004 can be implemented in the silver layer. The second touch electrode 1004 can be connected to the copper layer using a via 1006 and to a copper routing trace 1008. In some examples, the touch node illustrated in FIG. 10 can represent a unit cell that be repeated across the touch sensor panel (the first and second touch electrodes can be repeated without having the vias/routing trace for a respective second electrode more than once).

As illustrated in FIG. 10, the first and second touch electrodes can have a comb structures, in some examples. For example, the first touch electrode 1002 can include a first comb structure (e.g., with a vertical backbone with horizontal prongs) and the second touch electrode 1004 can include a second comb structure. The comb structures of the first and second touch electrodes can be complementary such that the prongs of the first comb structure generally interlock with progs of the second comb structure.

In some examples, as illustrated in FIG. 10, the electrodes can make edge-to-edge symmetric pattern for all touch nodes, including symmetric distances. For example, FIG. 10 illustrates measurements H1-H8 and L1-L5, representing planar dimensions of the touch electrodes. In some examples, the size, shape, and spacing of the touch electrode can be designed to meet a design specification for baseline mutual capacitance between the first and second touch electrodes and/or for change in mutual capacitance coupling due to the contact or proximity of an object. In some examples, H1 can represent the height of the first touch electrode and can be between 5.25-5.5 microns, and L1 can represent the length of the first touch electrode and can be between 4.75-5 microns. In some examples, L5 can represent the length of the second touch electrode and can be between 5-5.25 microns. L2 can represent the horizontal separation length between the vertical backbone of the first touch electrode and portions of the second touch electrode, and can be between 0.2-0.3 microns. As shown in FIG. 10 and represented by L3, the offset between L1 and L5 on each side of touch node can be between 0.05-0.25 microns. L4 can represent the horizontal length across the vertical segments of the second touch electrodes and can be between 0.1-0.2 microns. H3 can represent the vertical height of the center horizontal prongs of the first touch electrode (and the vertical height of the combination of top and bottom segments of edge horizontal prongs of the first touch electrode), and can be between 0.1-0.2 microns. H2 can represent the vertical height separation between the edge horizontal prong of the first touch electrode and the proximate portion of the second touch electrode, and can be between 0.3-0.45 microns. H5 can represent the vertical height separation between the center horizontal prong of the first touch electrode and the proximate portion of the second touch electrode, and can be between 0.4-0.5 microns. H4 can represent the vertical height separation between portions of the second touch electrodes, and can be between 1.25-1.5 microns. H7 can represent the vertical height separation between the edge horizontal prong of the first touch electrode and a center horizontal prong of the first touch electrode, and can be between 1.25-1.5 microns. H6 can represent the vertical height of the horizontal center portion of the second touch electrode, and can be between 0.3-0.4 microns. H7 can represent the vertical height of the top/bottom portions of the second touch electrode, and can be between 0.5-0.75 microns.

Figure 11A:
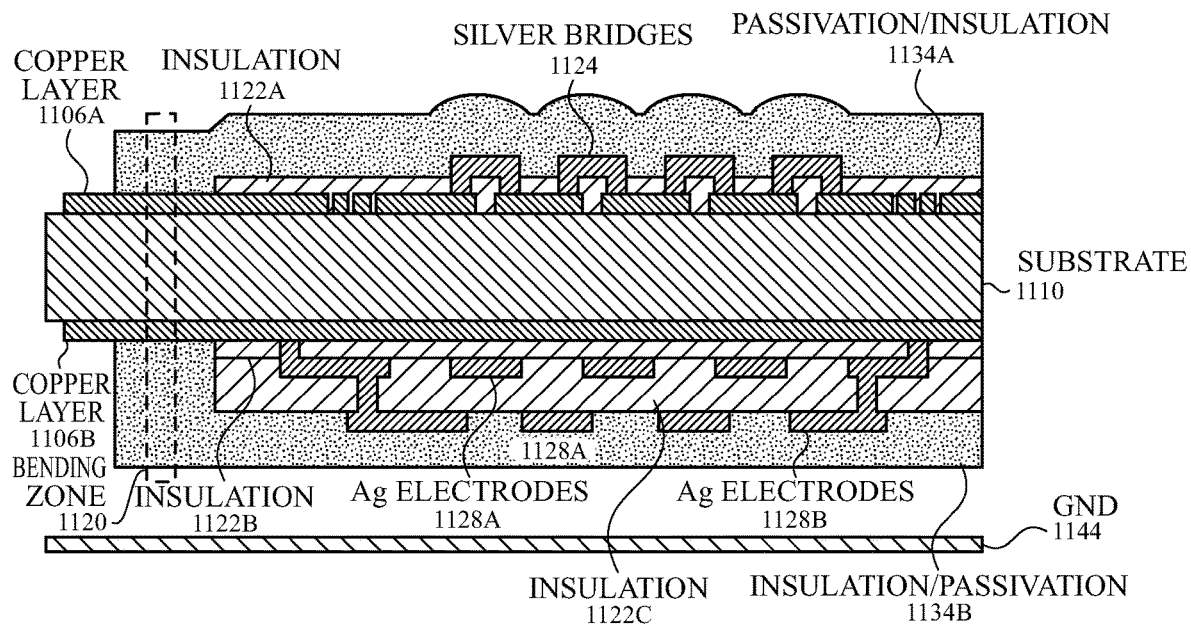
FIGS. 11A-11C illustrate example touch and force sensor panels according to examples of the disclosure.
Figure 11B:
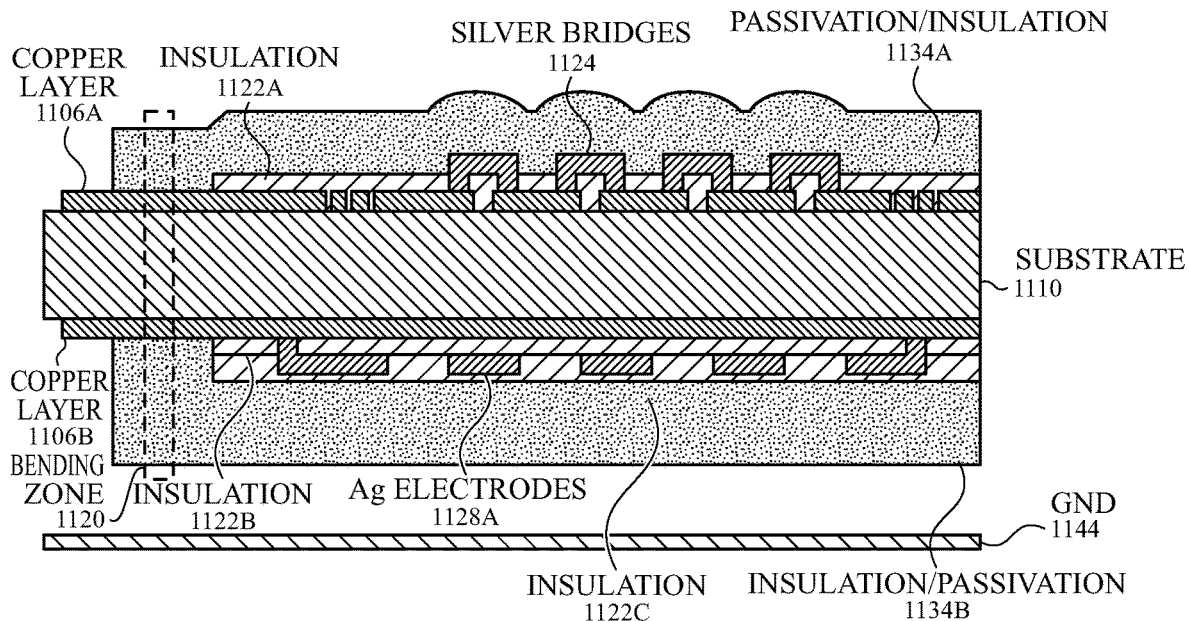
Figure 11C:
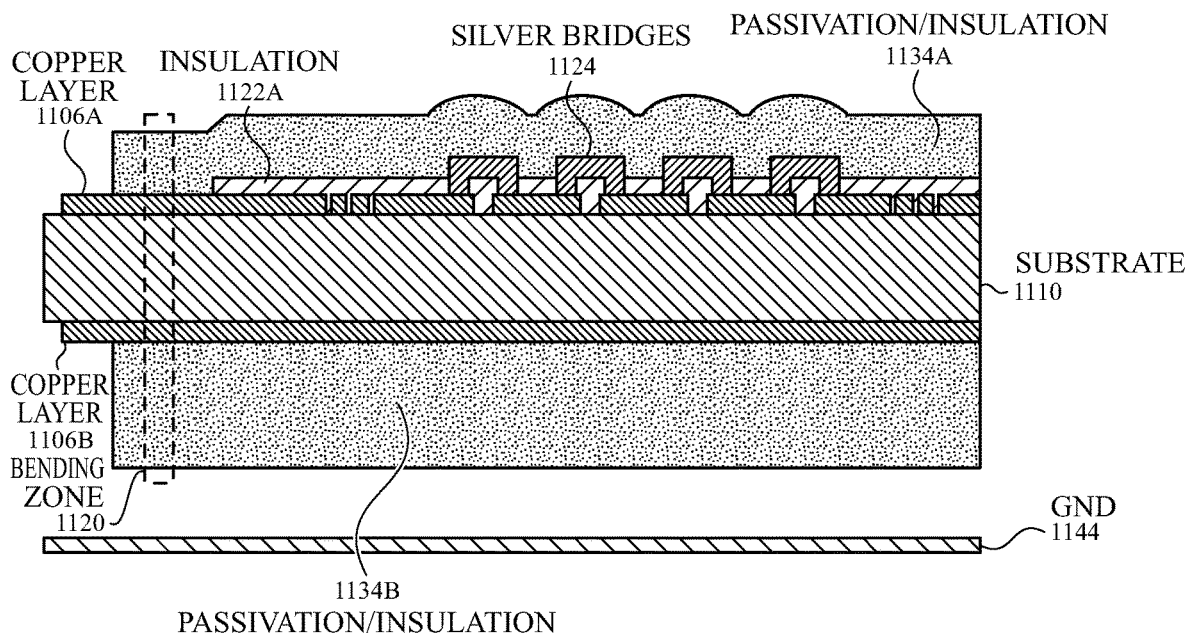

Although primarily described as a single-sided touch sensor stack-up herein, it is understood that in some examples, electrodes on the second side of the substrate in the touch sensor stack-up can be implemented for force sensing. FIGS. 11A-11C illustrate example touch and force sensor panels according to examples of the disclosure. FIG. 11A illustrates an example touch sensor panel including five metal layers, FIG. 11B illustrates an example touch sensor panel including four metal layers, and FIG. 11C illustrates an example touch sensor panel including three metal layers. FIGS. 11A-11C each include a top side that is similar to the description of touch sensor panels here (e.g., one copper and one silver metal layers), the details of which are not repeated for brevity. For example, FIGS. 11A-11C illustrate a substrate 1110 with touch electrodes and touch routing implemented in copper layer 1106A, an insulation layer 1122A, silver bridge 1124, and passivation/insulation layer 1134A (e.g., corresponding to substrate 810, patterned copper layer 806, insulation layer 522, passivation layer 834, respectively). Additionally, FIGS. 11A-11C illustrate stack-up processing to add layers on the second side of the substrate. For example, as illustrated in FIG. 11A, the second side can include a copper layer 1106B (e.g., corresponding to process stage 800, but applied to the second side of the substrate), which can be a shield layer to isolate touch from the force sensing circuitry. The second side can also include insulation, silver, and passivation layers. For example, the second side illustrated in FIG. 11A includes two silver layers in which silver electrodes 1128A and 1128B can be implemented. The second side illustrated in FIG. 11A also includes insulation layers 1122B and 1122C to insulate between the copper layer 1106B and the first silver layer, and between the first silver layer and the second silver layer. A passivation (optionally including insulation) layer 1134B can also be included over the silver electrodes/insulation layers. In some examples, silver electrodes 1128B can be grounded and silver electrodes 1128A can be used to measure force applied to the trackpad due to changes in self-capacitance measured at some or all of the silver electrodes 1128A. In some examples, the silver electrodes 1128 can be used to measure force due to changes in self-capacitance measured at some or all of the silver electrodes 1128A-1128B. Additionally or alternatively, the stack-up can include a ground electrode 1144 (e.g., ground shield). Additionally or alternatively, in some examples, the force can be measured using a change in mutual capacitance between some or all of the silver electrodes 1128A-1128B and ground (e.g., capacitive gap sensing). In some examples, the ground electrode 1114 can be driven (instead of grounded) and the silver electrodes can be sensed for capacitive gap sensing. Although FIG. 11A shows the second side of substrate 1110 with three metal layers including one copper layer and two layers of silver electrodes, in some examples, the second side can have fewer metal layers. For example, FIG. 11B illustrates the second side of substrate 1110 implemented using the same process as the first side to implement the force sensing touch electrodes in a first silver layer (without a second silver layer). In some examples, as illustrated in FIG. 11C, the copper layer 1106B can be patterned to form force sensing electrodes (e.g., instead of being used as a shield), and force sensing can be achieved using measurement of the copper electrodes in patterned copper layer 1106B and/or ground electrode 1144 (without silver electrodes 1128A and 1128B, nor insulation 1122B and 1122C in comparison to the design of FIG. 11A). In some such examples, the touch sensor panel thickness can be reduced relative to the stack-up of FIG. 11A by reducing the number of metal layers (e.g., perhaps limiting the second side to copper layer 1106B and passivation layer 1134B.

In some examples, a touch sensor panel includes a substrate, a plurality of electrodes formed in a first layer on a first surface of the substrate from a first material, the plurality of electrodes forming first electrodes and second electrodes and the plurality of electrodes defining an active area for touch sensing, a plurality of routing traces formed in the first layer on the first surface of the substrate in a border area outside the active area, the plurality of routing traces formed from the first material, wherein the first material includes copper, and a plurality of bridges formed in a second layer, different from the first layer, the plurality of bridges connecting groups of the plurality of electrodes to form the first electrodes, and the plurality of bridges formed from a second material different than the first material, wherein the second material includes silver.

Additionally or alternatively, in some examples, each routing trace of the plurality of routing traces has a width between 10 microns and 25 microns.

Additionally or alternatively, in some examples, each routing trace of the plurality of routing traces is spaced apart from another routing trace of the plurality of routing traces by between 10 microns and 25 microns.

Additionally or alternatively, in some examples, the border area has a width less than 2 millimeters.

Additionally or alternatively, in some examples, a height of the touch sensor panel is less than 50 microns.

Additionally or alternatively, in some examples, the touch sensor panel further including one or more shield electrodes formed in the second layer from the second material, above the plurality of routing traces in the border area.

Additionally or alternatively, in some examples, the one or more shield electrodes reduces parasitic coupling.

Additionally or alternatively, in some examples, the substrate is formed from a flexible material and includes a bending portion.

Additionally or alternatively, in some examples, the touch sensor panel includes sensing circuitry connected to the substrate and connected to the plurality of routing traces at a location after the bending portion of the substrate.

Additionally or alternatively, in some examples, the flexible material is polyethylene terephthalate.

Additionally or alternatively, in some examples, the substrate is less than 25 microns.

Additionally or alternatively, in some examples, the plurality of electrodes is patterned by a wet etching process.

Additionally or alternatively, in some examples, the touch sensor panel further includes an insulator layer between the first layer and the second layer.

Additionally or alternatively, in some examples, the insulator layer is between 1 micron and 2 microns.

Additionally or alternatively, in some examples, the first electrodes have a first comb structure, and the second electrodes have a second comb structure such that the plurality of first electrodes and the plurality of second electrodes interlock.

Additionally or alternatively, in some examples, a bridge of the plurality of bridges between a first electrode of the plurality of electrodes and a second electrode of the plurality of electrodes is connected to the first electrode by a via to a center of the first electrode and connected to the second electrode by a via to a center of the second electrode.

In some examples, an electronic device includes an energy storage device, wireless communication circuitry, a display, and the touch sensor panel as described above.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel including:
   a substrate;
   a plurality of electrodes formed in a first layer on a first surface of the substrate from a first material, the plurality of electrodes forming first electrodes and second electrodes and the plurality of electrodes defining an active area for touch sensing;
   a plurality of routing traces formed in the first layer on the first surface of the substrate in a border area outside the active area, the plurality of routing traces formed from the first material, wherein the first material includes copper; and
   a plurality of bridges and one or more shield electrodes formed in a second layer, different from the first layer, wherein:
   the plurality of bridges connect groups of the plurality of electrodes to form the first electrodes, the plurality of bridges and the one or more shield electrodes are formed from a second material different than the first material, wherein
the second material includes silver,
the one or more shield electrodes positioned above the plurality of routing traces in the border area, and
the first layer is between the second layer and the first surface of the substrate.

2. The touch sensor panel of claim 1, wherein each routing trace of the plurality of routing traces has a width between 10 microns and 25 microns.

3. The touch sensor panel of claim 1, wherein each routing trace of the plurality of routing traces is spaced apart from another routing trace of the plurality of routing traces by between 10 microns and 25 microns.

4. The touch sensor panel of claim 1, wherein the border area has a width less than 2 millimeters.

5. The touch sensor panel of claim 1, wherein a height of the touch sensor panel is less than 50 micron.

6. The touch sensor panel of claim 1, wherein the one or more shield electrodes reduce parasitic coupling.

7. The touch sensor panel of claim 1, wherein the substrate is formed from a flexible material and includes a bending portion.

8. The touch sensor panel of claim 7, further comprising: sensing circuitry connected to the substrate and connected to the plurality of routing traces at a location after the bending portion of the substrate.

9. The touch sensor panel of claim 7, wherein the flexible material is polyethylene terephthalate.

10. The touch sensor panel of claim 1, wherein the substrate is less than 25 microns.

11. The touch sensor panel of claim 1, wherein the plurality of electrodes is patterned by a wet etching process.

12. The touch sensor panel of claim 1, further comprising an insulator layer between the first layer and the second layer.

13. The touch sensor panel of claim 12, wherein the insulator layer is between 1 micron and 2 microns.

14. The touch sensor panel of claim 1, wherein:
the first electrodes have a first comb structure; and
the second electrodes have a second comb structure such that a plurality of the first electrodes and a plurality of the second electrodes interlock.

15. The touch sensor panel of claim 1, wherein
a bridge of the plurality of bridges between a first electrode of the plurality of electrodes and a second electrode of the plurality of electrodes is connected to the first electrode by a via to a center of the first electrode and connected to the second electrode by a via to a center of the second electrode.

16. An electronic device including:
an energy storage device;
wireless communication circuitry;
a display; and
a touch sensor panel comprising:
a substrate,
a plurality of electrodes formed in a first layer on a first surface of the substrate from a first material, the plurality of electrodes forming first electrodes and second electrodes and the plurality of electrodes defining an active area for touch sensing,
a plurality of routing traces formed in the first layer on the first surface of the substrate in a border area outside the active area, the plurality of routing traces formed from the first material, wherein the first material includes copper, and
a plurality of bridges and one or more shield electrodes formed in a second layer, different from the first layer, wherein:
the plurality of bridges connect groups of the plurality of electrodes to form the first electrodes,
the plurality of bridges and the one or more shield electrodes are formed from a second material different than the first material,
the second material includes silver,
the one or more shield electrodes are positioned above the plurality of routing traces in the border area, and
the first layer is between the second layer and the first surface of the substrate.

17. The electronic device of claim 16, wherein each routing trace of the plurality of routing traces has a width between 10 microns and 25 microns.

18. The electronic device of claim 16, wherein each routing trace of the plurality of routing traces is spaced apart from another routing trace of the plurality of routing traces by between 10 microns and 25 microns.

19. The electronic device of claim 16, wherein the border area has a width less than 2 millimeters.

20. The electronic device of claim 16, wherein a height of the touch sensor panel is less than 50 micron.

* * * * *